United States Patent
Loosli (12)

(10) Patent No.: US 6,383,277 B1
(45) Date of Patent: *May 7, 2002

(54) INK SET FOR UTILIZATION IN INKJET PRINTERS

(75) Inventor: Daniel Loosli, Bern (CH)

(73) Assignee: Pelikan Produktions AG, EGG/ZH (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/129,928

(22) Filed: Aug. 6, 1998

(30) Foreign Application Priority Data

Aug. 7, 1997 (DE) .......................... 197 34 241

(51) Int. Cl.⁷ ............................... C09D 11/00
(52) U.S. Cl. ................. 106/31.6; 106/31.28; 106/31.86
(58) Field of Search ............................ 106/31.6, 31.28, 106/31.85

(56) References Cited

U.S. PATENT DOCUMENTS

| 5,320,668 | A | | 6/1994 | Shields et al. | |
| 5,488,402 | A | * | 1/1996 | Shields et al. | 106/31.13 |
| 5,518,534 | A | | 5/1996 | Pearlstine et al. | |
| 5,531,816 | A | | 7/1996 | Wickramanayake | 106/31.78 |
| 5,713,989 | A | * | 2/1998 | Wickramanayake et al. | 106/31.6 |
| 5,730,790 | A | * | 3/1998 | Rehman | 106/31.59 |
| 5,735,941 | A | * | 4/1998 | Freeman et al. | 106/31.28 |
| 6,036,759 | A | * | 3/2000 | Wickramanayake et al. | 106/31.28 |

FOREIGN PATENT DOCUMENTS

| EP | 0 576 151 A1 | 12/1993 |
| EP | 0 586 079 A1 | 3/1994 |
| EP | 0 588 241 A2 | 3/1994 |
| EP | 0 595 523 A2 | 5/1994 |
| EP | 0 633 142 A1 | 1/1995 |
| EP | 0 753 551 A2 | 1/1997 |
| EP | 0 776 951 A2 | 6/1997 |
| EP | 0 838 507 A1 | 4/1998 |
| GB | 2 315 493 A | 2/1998 |
| GB | 2 315 759 A | 2/1998 |

* cited by examiner

Primary Examiner—Mark L. Bell
Assistant Examiner—Veronica F. Faison
(74) Attorney, Agent, or Firm—Fay, Sharpe, Fagan, Minnich & McKee, LLP

(57) ABSTRACT

Description of an inkset for utilization in inkjet printers, comprising a first ink containing a watery ink medium, a first color pigment dispersed in the ink medium, and optionally, a first dispersing medium, whereby the first color pigment and/or the first dispersing medium carry ionic groups, a second ink containing a watery ink medium, a color substance soluble in the ink medium, whereby the soluble color substance acts as precipitation means for the first color pigment. A first ink containing a watery ink medium, a first color medium dispersed in the ink medium and optionally, a first dispersing medium, whereby the first color pigment and/or the first dispersing medium carry ionic groups, a second ink containing a watery ink medium and a second color pigment and/or, optionally, a second dispersing medium, whereby the second color medium and/or the second dispersing medium act as precipitation agent for the first color pigment. A first ink containing a watery ink medium, a first color pigment dispersed in the ink medium and optionally, a first dispersing medium, whereby the first color pigment and/or the first dispersing agent carry ionic groups, a second ink containing a watery ink medium and a water soluble, solvent-dissolved solvent color substance, optionally, with an emulsifier for this system, whereby the solvent color substance, the emulsifier and/or the water-insoluble act as precipitation agents for the first color pigments. These inks specifically reduce the bleeding at the contact lines of the different coloring during printing, and they have an adequate shelf life.

19 Claims, No Drawings

INK SET FOR UTILIZATION IN INKJET PRINTERS

BACKGROUND OF THE INVENTION

The present invention relates to an ink set for utilization in inkjet printers.

Inkjet printing finds growing distribution, specifically for so-called "Desk Top Publishing" application which is particularly attributable to its capacity to produce multi-colored prints by application of three or more primary inks onto a substrate in one single pass through.

Other printing methods generally require one pass through the printer for each primary color. An important benefit of the inkjet printers is, furthermore, their favorable price.

Thermal inkjet printing systems play a particularly important role. They have an ink reservoir, connected in liquid-conducting fashion with the print head, on which are located a plurality of resistors. The selective activation of the resistors provokes thermal excitation of the ink and its outward propulsion. Exemplary thermal inkjet print systems are described in the U.S. Pat. Nos. 5,500,895 and 4,794,409. Other systems are based on the so called Piezo-technology, in which a piezo element is excited via a current impulse causing outward propulsion of a drop of ink.

Creation of multi-colored images is possible by application of special inkjet print heads having a plurality of individual ink compartments. Each compartment holds a selected ink having special color properties. By combining these ink materials on one substrate, for example paper, in different configurations and quantities, it is possible to produce multi-colored images having high resolution and clarity.

When producing multi-colored images via inkjet print, there occurs, however, a problem if an ink of one color is applied onto or in the immediate proximity to an ink of a different color. This problem expresses itself in a mixing or "running together" of the two inks at their border areas, as a result of which the borderline between the inks becomes blurred, for example, at the outer edges. If, for example, a black image area is printed directly next to a yellow image area, one notes, in most cases, a diffusion of the black ink into the yellow ink. One obtains unsatisfactory images having poor resolution. This phenomenon is known to persons skilled in the art of print technology under the term "color bleeding". Furthermore, problems of "running together" of color in multiple ink systems can be caused by capillary forces, which originate with the commonly used paper substrates. The capillary forces result in the print inks being sucked into neighboring areas. This also results in a printout of poor quality and resolution.

Several methods have already been suggested to reduce or prevent the "running together" of the inks at the contact lines. Thus, the bleeding problem was to be minimized by more rapid penetration of the inks into the medium to be imprinted. Such more rapid penetration can be obtained by adding to the printing inks, surface active substances, such as tensides, wetting agents, alcohols, solvents and similar. This is proposed, for example, in U.S. Pat. Nos. 5,106,416 and 5,196,056. This attempt at solving the problem results in only insufficient reduction of the bleeding. Additional drawbacks consist in greater "feathering", i.e., the inks show greater tendency to run alongside the paper fibers. By more rapid penetration into the paper, the portion of the coloring substance, available on the surface of the paper, becomes smaller. This leads to reduction in the optical density and is particularly noticeable with black ink on white paper. Cohesive color areas no longer appear deep black, but gray.

In a modification of said method, a rapidly penetrating ink is printed at the contact surfaces under a slowly penetrating ink. As a result, in these spots the slow penetrating ink penetrates also more quickly into the paper, and bleeding is reduced. The printing process is hereby controlled by specially programmed software. Preferably, the black ink is the slowly penetrating ink and a colored ink, the rapidly penetrating ink. With this modification, bleeding overall is also little diminished. Additionally, one obtains a weaker and variable black color shade.

In another modification, all colors are printed above each other at the contact surfaces, with the colored inks being rapidly penetrating inks and the black ink a slowly penetrating ink. In this proposal also, the optical density of the black ink is again reduced by the more rapid penetration; this is, however, complimented by the mixed color of the colored inks, which, based on the subtractive color mixtures, leads to a black color shade. The drawbacks consist here also in insufficient reduction of the bleeding and in the variable shade of black.

Another suggestion is presented in EP 0 705 889 A1, which makes use of gel-forming inks. An ink, preferably the black ink, contains a gel-forming reagent and another ink, preferably the colored ink, a gel-initiating reagent. When making contact at the contact line, there forms between the two inks a gel barrier. The formed gel, however, dries extremely slow, as a result of which wipe resistance is decreased. In addition, the inks have insufficient shelf life because greater instability risk is caused by the presence of the gel-forming or the gel-initiating reagent. With drying of ink at the print nozzle, viscosity, furthermore, greatly increases, which leads to increased clogging risk.

A commercially available inkset product is also known where a first ink contains a coloring substance which can be precipitated by a precipitation reagent. A second ink contains the precipitation reagent in addition to a second coloring substance. It is, hereby, of disadvantage that the precipitation reagent of the second ink must be admixed in high concentration, which carries with it significant risk of instability or risk of cogation. The high percentage of precipitation reagent can also lead to corrosion problems. Precipitation agents, for example metallic salts of higher valence such as $Ca^{2+}$, $Cu^{2+}$, $Co^{2+}$, $Ni^{2+}$, etc. The selection of coloring substances, which may be present in the second ink, is highly limited, since only such coloring substances come under consideration that will remain soluble or dispersed over an extended period of time in the presence of the precipitation reagent.

The present invention was, therefore, based on the object of providing a multi-color inkjet print method, which does not have the previously described drawbacks, and for which specifically the bleeding has been sufficiently reduced at the contact lines of different colors, whereby the color shade of the printed ink does not undergo change, high optical density of the inks is retained and the employed printing inks have adequate shelf life.

The applicant, surprisingly, has found that these problems are prevented or greatly minimized if an inkset is used where a first ink contains a watery ink medium—if necessary with assistance from a dispersing agent—a dispersed first color pigment and the coloring substance of a second ink acts as precipitation agent for the first color pigment.

Accordingly, the invention concerns in one specific embodiment an inkset for utilization in inkjet printers, comprising a) a first ink, which contains: (a1) a watery ink medium, (a2) an in-the-ink medium dispersed first color pigment and (a3) optionally, a first dispersing agent, whereby the first color pigment and/or the first dispersing agent carry ionic groups b) a second ink, which contains: (b1) a watery ink medium and b2) an in the ink medium soluble coloring substance whereby the soluble coloring substance acts as precipitation agent for the first color pigment water insoluble, solvent-dissolved solvent dye, optionally with an emulsifier for this system, whereby the solvent dye, the emulsifier and/or the in water insoluble solvent act as precipitation medium for the first color pigment.

In another specific embodiment, the invention concerns an inkset for utilization in inkjet printers, comprising (a) a first ink, which contains: (a1) a watery ink medium, (a2) an in-the-ink medium dispersed first color pigment and (a3), optionally, a first dispersing agent, whereby the first color pigment and/or the first dispersing agent carry ionic groups, (b) a second ink which contains: (b1) a watery ink medium and (b2) a water insoluble, solvent-dissolved solvent dye, optionally with an emulsifier for this system, whereby the solvent dye, the emulsifier and/or the water-soluble solvent act as precipitation medium for the first color pigment.

According to the invention, the first ink contains a dispersed color pigment. Pigment dispersions have pigment particles which are small enough to ensure unimpeded flow of ink through the ink conducting components of the printer, specifically through the print nozzles, and which generally have a particle size ranging from 25 to 500 $\mu$m. The particle size also has an influence upon the stability of the pigment dispersion. The first ink can optionally contain a first dispersion medium. The first color pigment, or the first dispersion medium or both, color substance and dispersion medium, carry ionic groups. Ionic groups can be introduced via surface modification of pigments, for example, via sulfonation, carboxylation or introduction of amino groups. As an example, surface modified carbon black can be mentioned, for example surface-oxidized carbon black. Dispersing agents which carry ionic groups are, primarily, block copolymers with blocks of ionic monomers, such as

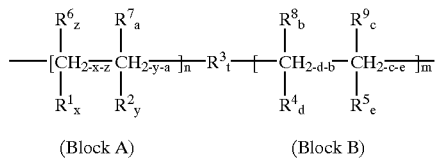

(Block A)        (Block B)

whereby x, y, a, b, c, d, e=0 or 1;
x+y+z+a or b+c+d+e=1, 2 or 3;
f=0, 1, 2, 3, preferably 0;
$R^3$=—$CH_2$—; —O—, NH; . . . ; and $R^1$, $R^2$, $R^4$, $R^5$, $R^6$, $R^7$, $R^8$, $R^9$, constituting the functional groups.

Good stability of pigments in water is mainly obtained if the one block contains a hydrophil functional group and another block a hydrophobe functional group. Arrangement of the blocks is either . . . AAABBB . . . or ABABABAB . . . or ABBAABAABAAABB . . . Example of hydrophil functional groups are: carbonic acid, amine-, pyrrolidone groups and their derivatives. Examples of hydrophobe functional groups are the alkyl and the phenyl group and similar. Preferably, there is present per block only one functional group. The remaining residues are then for example: —H; $CH_3$ etc.

Appropriate examples are, in addition, acrylate-styrol block copolymers (=carboxy-phenyl-block-copolymer), pyrrol idone-acrylate-block-copolymers and the like.

The dispersed pigment particles of the first ink can be precipitated, i.e., coagulated. The color-carrying particles agglomerate during this step. According to the invention, this occurs via the coloring substance in the second ink. The precipitation preferably occurs in that the coloring substance of the second ink contributes to such an ionic strength of the second ink that with mixing of a first and a second ink, an ionic strength sets in which is above the critical ionic strength for precipitation of the first color pigment. As a result of the increase in the ionic strength, the radius of the Helmholtz double layer decreases and, consequently, the distance between two dispersed particles. If the distance between two particles is reduced below a given value, then these particles agglomerate and the dispersion becomes unstable. Thus, a dispersed pigment can be precipitated by increasing the ionic strength. The ionic strength where precipitation of the pigment begins is called critical ionic strength. The critical ionic strength depends upon the respective color pigment and the optionally employed dispersing medium.

The coloring substance of the second ink alternatively carries a charge which is opposite the charge of the first color pigment and/or the first dispersing medium. The groups of the opposite charge have a high affinity to the stabilizing ionic groups of the first color pigment or the first dispersing medium. As a result, the solvating capacity of both groups is greatly reduced and the dispersed pigments agglomerate and precipitate.

In the first specific embodiment of the invention, the coloring substance of the second ink is a dye which is soluble in the ink medium. The soluble dye preferably has two ionic groups. The following examples can be cited: direct blue 1, direct blue 70, direct blue 84, acid red 1, acid red 35, acid red 41, direct red 99, direct yellow 34 and direct yellow 51.

Otherwise, the soluble coloring substances can be conjugated with a chemical compound which carries at least two charges. These chemical compounds can be coordinated with the soluble coloring substance via co-valent or ionic chemical bonds. The soluble coloring substance is preferably conjugated with a di- or multi-valent opposite ion. The di or multi-valent opposite ions can, for example be $Ca^{2+}$, $Cu^{2+}$, $Mg^{2+}$, $Ni^{2+}$, $La^{3+}$, $Nd^{3+}$, $Y^{3+}$, and $Al^{3+}$. Examples of conjugations of soluble coloring substances with di- or multi-valent opposite ions are, among others,: Acid yellow 23 calcium salt, direct blue 199 magnesium salt, acid red 52 magnesium salt, acid yellow 23 ethylene di-ammonium salt, etc.

Other examples of suitable conjugations in the sense of the invention are reactive red 180, reacted with triethylenamine, reactive red 180 reacted with polyethyleneimene, reactive yellow 37 reacted with tributylene-amine.

In the second specific embodiment of the invention, the second ink contains a dispersed color pigment and, optionally, a second dispersing agent. The second color pigment and/or the second dispersing agent act as precipitation medium for the first color pigment. This is preferably achieved in that the second color pigment and/or the second dispersing agent contribute toward such concentration of ionic strength that during mixing of the first and second ink, an ionic strength sets in which is above the critical ionic strength for precipitation of the first color pigment. Otherwise, the second color pigment and/or the second dispersing agent can carry a charge which is opposite the charge of the first color pigment. Examples of suitable second color pigments, which can cause, by themselves or together with a dispersing agent, precipitation of the first color pigment are, among others: cationic surface-modified pigments, pigment blue 15:3 dispersed with Glucquat ® 100 (Laurylmethylgluceth-10-hydroxypropyl-dimoniumchloride/CFTA-adapted name), pigment yellow dispersed with Gafquat® HS-100 (methacrylamidopropyl-trimethylammonium-chloride)/quaternary copolymer in form of a co-polymer from polyvinyl-pyrrolidone and methacrylamidepropyl-trimethylammonium-chloride (MAPTAC), pigment red 122 dispersed with Polytheylene-amine, pigment yellow 3 dispersed with Ethoquat® C25 (Coco-N-methyldipolyetheleneglycol-chloride), pigment red 170 dispersed with Varonic® K210 (Polyethyleneglycol (1)cocoamine).

The second dispersing agent can preferably be a polyelectrolyte. Suitable examples are styrol-phosphate block co-polymers, quaternary amine-pyrrolidone block polymers and PVP-dimethylaminomethylmethacrylate block polymers.

In the third specific embodiment of the invention, the second ink comprises a micro-emulsion as a color system. In a micro-emulsion, a solution-soluble color substance is present in dissolved form in a solvent, which is not mixable with the ink medium. The color substance solution is highly emulsified in the ink medium. The droplet size of the color substance solution is sufficiently small so that a stable emulsion results therefrom. In general, an emulsifier is required for this purpose. According to the invention, the solvent color substance, the emulsifier and/or the solvent can act as precipitation agent for the first color pigment. The emulsifier preferably contributes to such an ionic strength of the second ink that in mixing of the first and the second ink, an ionic strength sets in which is above the critical ionic strength for precipitation of the first color pigment. Alternatively, the emulsifier has a charge which is opposite the charge of the first color pigment and/or the first dispersing agent. In another alternative solution, the solvent can have such ionic strength that in mixing of first and second ink, an ionic strength sets in which is above the critical ionic strength for precipitation of the first color pigment. Suitable examples for solvent color pigments are Solvent yellow 79, Solvent yellow 82, Solvent yellow 160, Solvent yellow 93, Disperse yellow 201, Solvent red 218, Solvent red 127, Solvent red 91, Disperse violet 31, Solvent blue 70, Solvent blue 38, Solvent blue 97, Solvent blue 44. Suitable examples for solvents are toluol, phenyl-glycolether, alkanoles, alkanes, fats/oils, cyclohexane, stearic acid, ethylacetate. Suitable examples for emulsifiers are emulsifiers from the amphiphile group such as Naphthylpolypropylene-glycol-propylsulfonate (Ralufon Nape® 14–90), Octylpyrrolidone (Surfadon® LP 100), liposomes (for example, Nathin® 140), dimethyldodecylnoxide, and the like.

The ink medium of the first and the second ink of the inkset according to the invention is watery. It contains water or a mixture of water and one of several water-mixable organic solvents. The selection of a suitable mixture depends upon the requirements of the respective application, such as specified surface tensions, the coloring substance, the drying time and the to be imprinted substrate. Based on simple tests, the expert is able to determine a suitable ink medium.

The inks can contain solvents such as n-propanol, 1,2-butandiol, 2-isopropyloxyethanol, benzamide, benzyl-alcohol, butyl-diglycol, butyl-glycol, butyltri-glycol, butyrolactone, di-isopropanolamine, di-methylimidazolidanone, d-propyleneglycol-n-propylether, di-propylene-glycolmonobutylether, di-propylene-glycolmomethylether, ethanol, ethylacetate, ethylenecarbonate, ethylene-glycolphenylether, isopropanol, N, N-butyl-1-ethanolamine, n-butanol, N-methylpyrrolidone, polypropyleneglycol, propylene-ethelene-glycol-block polymer and propylene-carbonate. They can, furthermore, contain biocides. The inks can contain additional emulsifiers, such as, for example, dodecylamine, the sodium salt of N-coco-3-amino butyric acid, cocotrimethyl-ammoniumchloride, didecylmethyl-alko-ammonium-propionate, N-cocodiaminopropane, etc., moisture retaining agents, such as 1,1,1-trishydroxymethylpropane, 1,2,6-hexantriole, 1,3 dimethylimidazolidinone, 1,4 butandiole, 1,6-hexandiole, 2-methyl-2,4-pentandiole, 2-hydroxybenzyl-alcohol, 2-pyrrolidone, 5-aminobenzoic acid, etc.,-thickening agents, such as alginic acid, polyvinylpyrrolidine-polymers and co-polymers, alginates, polyacrylic acids, etc., tensides, such as akylphenyl-PEG, PEG-stearyl-ether, alkyl-polyglycosides, alkyl-sulfonates, ethothylated fatty alcohols, alkylsulfopropyl-ammonium-betaines, alkylphenyl-sulfonates, di-meticonpropolyoles, alkylpyrrolidones, etc.

The inkset according to the invention comprises at least two inks. It can, however, also comprise three and more inks, for example, up to six inks. In specific embodiments of more than two inks, it is essential that at least two inks engage in functional reciprocal action, as described above.

The invention will now be explained in more detail, based on examples:

EXAMPLES

The inks were produced according to the recipes specified in Tables 1 and 2. With respect to the black ink and the three comparison inks, the substances were combined in the specified sequence and filtered (3 microns) after stirring for one hour.

In the examples 1, 8, 10 and 16, the pigment was mixed with the dispersing agent. Subsequently, a sufficient amount of de-mineralized water was added until the solution became stirrable (with some dispersions, no water was needed). While stirring vigorously, the particles were once again reduced by means of ultrasound. It happened, occasionally, that the viscosity increased. In such cases, water had to again be added. The thusly obtained preparation was left standing for at least two days. After that, the homogeneous solution was carefully drawn off. The same additives were added to this preparation as the additives in the comparison inks. The obtained ink was now put through a 5 µm filter. As a results of the improved manufacturing method, it was possible to significantly improve the stability of the dispersions.

In the examples 2, 3, 4, 11 and 14, the raw color substance was dissolved in ⅓of the total amount of water. To that, the mol-equivalent amount of LiOH and amine was added. The solution was stirred for one hour at 60 to 90° C. Subsequently, the specified pH-value was adjusted with acetic acid. The same additives were added to the color substance solution as to the comparison inks. The mixture was filtered.

In the examples 5, 6, 7, 12, 13, and 15, the raw color substance was transformed by ion exchanger column to pure acid form. The thereby obtained solution was passed via a cation exchanger column, whereby the column had been previously loaded with the specified cation (Ca, Mg, EDA). The thus obtained color substance was evaporated until dry. The ink was produced according to the recipe in Table 1 or 2 and was likewise filtered.

In each instance, 10 ml of ink was filled into a Pelikan-Click. These clicks were subsequently clicked into the respective adapter. Images were then printed out with an HP Desk Jet 660C, showing black test color border areas. An evaluation was performed as to the extent with which the colors intermingled on the paper (see Tables).

TABLE 1

| | Name of Substance | Chemical Description | Group | Black | Comp | Comp | Comp |
|---|---|---|---|---|---|---|---|
| 1 | Demineralized Water | | Solvent | 75,16 | 83,5 | 83,5 | 83,5 |
| 2 | Diethylene glycol | | Moistener | | 10 | 10 | 10 |
| 3 | Polyethylene glycol 600 | | Moistener | 2 | | | |
| 4 | Polyethylene glycol 1500 | | Moistener | 1 | | | |
| 5 | Polyethylene glycol 4000 | | Moistener | 1,2 | | | |
| 6 | Urea | | Moistener | 2 | | | |
| 7 | Dimethyl Urea | | Moistener | 2 | | | |
| 8 | Glycerine | | Moistener | 9,34 | | | |
| 9 | Butyl-diglycol | | Moistener | | 3 | 3 | 3 |
| 10 | Surfadon LP 100 | Alkyl-pyrrolidone | Tenside | 0,2 | | | |
| 11 | Surfyol 465 | {Ethoxylated {Tetra-methyl-decynediole | Tenside | | 0,4 | 0,4 | 0,4 |
| 12 | Acticid ST | | Biocide | 0,1 | 0,1 | 0,1 | 0,1 |
| 13 | Reactive Red 180 hydroxy-catal reacted with Jeffamin DU 700 | ethoxylated Diamine | Color Substance | | | | |
| 14 | Reactive Red 180 hydroxy-catal reacted with triethylenamine | | Color Substance | | | | |
| 15 | Reactive Red 180 hydroxy-catal reacted with Phenyl-urea | | Color Substance | | | | |
| 16 | Gluquat 100 | Laurylmethyl-gluceth-10-hydoxypropyl-dimonium-chloride | Dispersing Agent | | | | |
| 17 | Heucosperse I KS 1720 | Carbon black dispersed with Acrylate/Styrol-Block-Polymer | Pigment Preparation | 8 | | | |
| 18 | Pigment blue 15:3 | | Pigment | | | | |
| 19 | Acid Yellow 23 Calcium Salt | | Color Substance | | | | |
| 20 | Acid Blue 9 | | Color Substance | | 3 | | |
| 21 | Reactive Red 180 | | Color Substance | | | | 3 |
| 22 | Reactive Yellow 37 | | Color Substance | | | 3 | |
| 23 | Direct Blue 199 Ca-Salt | | Color Substance | | | | |
| 24 | Reactive Red 180 Ca-Salt | | Color Substance | | | | |
| | Evaluation | Stability | | +++ | +++ | +++ | +++ |
| | | Bleeding | | | XX | XX | XX |

| | Name of Substance | Exp 1 | Exp 2 | Exp 3 | Exp 4 | Exp 5 | Exp 6 | Exp 7 |
|---|---|---|---|---|---|---|---|---|
| 1 | Demineralized Water | 46,5 | 82,8 | 82,7 | 83,1 | 83,5 | 83,5 | 82,5 |
| 2 | Diethylene glycol | 10 | 10 | 10 | 10 | 10 | 10 | 10 |
| 3 | Polyethylene glycol 600 | | | | | | | |
| 4 | Polyethylene glycol 1500 | | | | | | | |
| 5 | Polyethylene glycol 4000 | | | | | | | |
| 6 | Urea | | | | | | | |
| 7 | Dimethyl Urea | | | | | | | |
| 8 | Glycerine | | | | | | | |
| 9 | Butyl-diglycol | 3 | 3 | 3 | 3 | 3 | 3 | 3 |
| 10 | Surfadon LP 100 | | | | | | | |
| 11 | Surfyol 465 | 0,4 | 0,4 | 0,4 | 0,4 | 0,4 | 0,4 | 0,4 |
| 12 | Acticid ST | 0,1 | 0,1 | 0,1 | 0,1 | 0,1 | 0,1 | 0,1 |
| 13 | Reactive Red 180 hydroxy-catal reacted with Jeffarnin DU 700 | | | | 3,40 | | | |
| 14 | Reactive Red 180 hydroxy-catal reacted with triethylenamine | | | 3,60 | | | | |
| 15 | Reactive Red 180 hydroxy-catal reacted with Phenyl-urea | | | | | 3,8 | | |
| 16 | Gluquat 100 | | 30 | | | | | |
| 17 | Heucosperse I KS 1720 | | | | | | | |
| 18 | Pigment blue 15:3 | | 10 | | | | | |
| 19 | Acid Yellow 23 Calcium Salt | | | | | | 3 | |
| 20 | Acid Blue 9 | | | | | | | |
| 21 | Reactive Red 180 | | | | | | | |
| 22 | Reactive Yellow 37 | | | | | | | |
| 23 | Direct Blue 199 Ca-Salt | | | | | | 3 | |
| 24 | Reactive Red 180 Ca-Salt | | | | | | | 4 |
| | Evaluation  Stability | + | +++ | +++ | ++ | ++ | + | + |
| | Bleeding | ++ | + | + | X | ++++ | +++ | +++ |

TABLE 2

| Name of Substance | Chemical Description | Group | Exp 8 | Exp 9 | Exp 10 | Exp 11 | Exp 12 | Exp 13 | Exp 14 | Exp 15 | Exp 16 |
|---|---|---|---|---|---|---|---|---|---|---|---|
| 1 Demineralized Water | | Solvent | 50,5 | 64 | 62,5 | 82,7 | 83,5 | 82,5 | 82,3 | 83,5 | 72 |
| 2 Diethylene glycol | | Moistener | 10 | 10 | 10 | 10 | 10 | 10 | 10 | 10 | 10 |
| 3 Butyl-diglycol | | Moistener | 3 | 3 | 3 | 3 | 3 | 3 | 3 | 3 | 3 |
| 4 Sufynol 465 | Ethoxylated Tetra-methyldecynediole | Tenside | 0,4 | 0,4 | 0,4 | 0,4 | 0,4 | 0,4 | 0,4 | 0,4 | 0,4 |
| 5 Acticide ST | | Biocide | 0,1 | 0,1 | 0,1 | 0,1 | 0,1 | 0,1 | 0,1 | 0,1 | 0,1 |
| 6 Reactive Yellow 37 hydrocatal reacted with Tributhylenamine | | Color Substance | | | | | 3,8 | | | | |
| 7 Reactive Yellow 37 hydrocatal reacted with Polyethylenimine pH slowly adjusted to 6.5 with Acetic Acid | | Color Substance | | | | | | | 4,2 | | |
| 8 Glucquat 100 | Laurylmethylgluceth 10-hydroxypropyl-dimonium-chloride | Dispersing Agent | 24 | | | | | | | | |
| 9 Varonic K210 | PEG 10 cocoamine | Dispersing Agent | | 12,5 | | | | | | | |
| 10 Genamin SH 100 | Alkylamine | Dispersing Agent | | | | 16 | | | | | |
| 11 Gafquat 755 | PVP-dimethylamino-methylmethcrylate-co-polymer | Dispersing Agent | | | | | | | | | 4,5 |
| 12 Pigment Blue 15:3 | | Pigment | | | 10 | | | | | | |
| 13 Pigment Red 122 | | Pigment | | 8 | | | | | | | |
| 14 Pigment Yellow 3 | | Pigment | 12 | | | | | | | | 10 |
| 15 Direct Blue 199 Mg-Salt | | Color Substance | | | | | | 3 | | | |
| 16 Reactive Red 180 Mg-Salt | | Color Substance | | | | | | | 4 | | |
| 17 Direct Blue 199 Ethylene-diammonium salt | | Color Substance | | | | | | | | 3 | |
| Evaluation | | Stability | + | X | XX | ++ | +++ | +++ | XX | X | XX* |
| | | Bleeding | ++ | ++ | + | + | +++ | +++ | +++ | ++ | — |

Explanation of Symbols:
++++ excellent
+++ very good
++ good
+ satisfactory
X unsatisfactory
XX poor
XX* coagulated

What we claim is:

1. Inkset for utilization in inkjet printers, comprising:
   a first ink, containing:
      a watery ink medium,
      a first color pigment dispersed in the watery ink medium, the first color pigment having ionic groups; and
   a second ink containing:
      a watery ink medium,
      a color substance soluble in the watery ink medium, the soluble color substance being a precipitation medium for the first color pigment, having a charge opposite the charge of the first color pigment, and having an ion strength above the critical ion strength for precipitation of the first color pigment when mixing the first and second ink.

2. Inkset according to claim 1, characterized in that the soluble color substance has at least two ionic groups.

3. Inkset according to claim 1, characterized in that the soluble color substance is conjugated with a chemical compound which carries at least two charges.

4. Inkset according to claim 3, characterized in that the soluble color substance is conjugated with a di- or multi-valent opposing ion.

5. Inkset for utilization in inkiet printers, comprising:
   a first ink, containing:
      a watery ink medium,
      a first color pigment dispersed in the ink medium and optionally, a first dispersing agent, at least one of the color pigment and the first dispersing agent having ionic groups,
   a second ink, comprising:
      a watery ink medium, and
      a second color pigment, and, optionally, a second dispersing agent, the second color pigment being a precipitation means for the first color pigment and at least one of the second color pigment and the second dispersing medium having a charge opposite the charge of at least one of the first color pigment and the first dispersing medium.

6. Inkset according to claim 5, characterized in that the second color pigment and/or the second dispersing agent contribute to such ion strength of the second ink that when mixing the first and second ink, there sets in an ion strength which is higher than the ion strength for precipitation of the first color pigment.

7. Inkset according to claim 5, characterized in that the second dispersing medium is a poly-electrolyte.

8. Inkset according to claim 7, characterized in that the poly-electrolyte is a styrol-phosphate-block-copolymer and/or a quaternary amine-glycose-block cop-polymer.

9. Inkset for utilization in inkjet printers, comprising:
a first ink, containing:
a watery ink medium,
a first color pigment dispersed in the ink medium, and
optionally, a first dispersing medium, at least one of the first color pigment and the first dispersing medium having ionic groups,
a second ink, containing:
a watery ink medium, and
a water-insoluble, solvent-dissolved solvent color substance,
and an emulsifier for this system, wherein at least one of the solvent color substance, the emulsifier and the water-insoluble solvent act as precipitation medium for the first color pigment and wherein the emulsifier carries a charge which is opposite the charge of at least one of the first color pigment and the first dispersing medium.

10. Inkset according to claim 9, characterized in that the emulsifier has high ion strength.

11. Inkset according to claim 9, characterized in that the water-insoluble solvent has high ion strength.

12. Inkset according to claim 1, characterized in that the first color pigment is a surface modified pigment.

13. Inkset according to claim 1, characterized in that the first dispersing medium is a block co-polymer.

14. Inkset according to claim 13, characterized in that the block co-polymer is an acrylate-styrol-block-co-polymer.

15. Inkset for utilization in inkjet printers, comprising:
a first ink, containing:
a watery ink medium,
a first color pigment dispersed in the ink medium,
and a first dispersing agent, at least one of the first color pigment and the first dispersing agent having ionic groups,
a second ink, containing:
a watery ink medium,
an acidic color substance, soluble in the ink medium, the soluble color substance being a precipitation medium for the first color pigment and having a charge opposite the charge of at least one of the first color pigment and the first dispersing agent.

16. Inkset according to claim 15, characterized in that the soluble color substance contributes to such ion strength of the second ink, that when mixing the first and second ink, an ion strength sets in which is above the critical ion strength for precipitation of the first color pigment.

17. Inkset according to claim 15, characterized in that the soluble color substance has at least two ionic groups.

18. Inkset according to claim 15, characterized in that the soluble color substance is conjugated with a chemical compound which carries at least two charges.

19. Inkset according to claim 1 wherein said first ink, consists essentially of:
a watery ink medium, and
a first color pigment, dispersed in the watery ink medium, whereby the first color pigment carries ionic groups.

* * * * *